March 29, 1960  B. E. BEMENT  2,930,900

ENGINE STARTING CIRCUIT

Filed Oct. 7, 1957

INVENTOR.
BENJAMIN E. BEMENT
BY
ATTORNEY.

United States Patent Office 2,930,900
Patented Mar. 29, 1960

2,930,900
ENGINE STARTING CIRCUIT
Benjamin E. Bement, Rivera, Calif.
Application October 7, 1957, Serial No. 688,493
3 Claims. (Cl. 290—36)

This invention relates to engine starting circuits for internal combustion engines and the like which require electric starting motors.

Heretofore, difficulty has often been encountered in starting engines of the above type, especially in cold weather, and particularly, in starting relatively large engines such as are found on trucks, tractors, etc. One of the reasons for this difficulty is that the starting motor places a relatively large load on the battery at just the instant when full voltage is desired in the ignition circuit in order to obtain proper firing of the fuel. Due to this loading condition, the battery is seldom capable of applying its rated voltage to the ignition system during the starting operation.

It therefore becomes a principal object of the present invention to reduce the drop in voltage for the ignition system of an ignition fired internal combustion engine due to operation of the starting motor.

Another object is to provide additional voltage during an engine starting operation.

Another object is to enable proper starting of an engine even though its battery or batteries are in relatively poor condition.

Another object is to provide a circuit for an auxiliary battery in an engine starting circuit wherein the main battery maintains the auxiliary battery in fully charged condition.

Another object is to provide a circuit of the above type in which a minimum length of electrical wiring is required to insert the auxiliary battery and associated components in the electrical circuit of the engine.

The manner in which the above and other objects of the invention are accomplished will be readily understood on reference to the following specification when read in conjunction with the accompanying drawing, wherein.

The present application is a continuation-in-part of my copending application, Serial No. 533,644, filed on September 12, 1955, and entitled "Engine Starting Circuit," now Patent No. 2,843,758, issued July 15, 1958.

Figure 1:
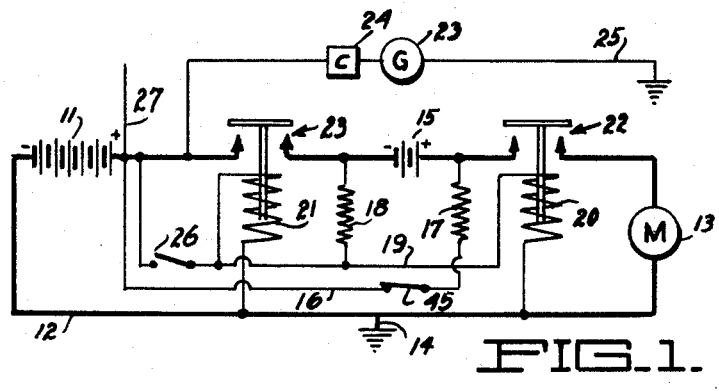
Fig. 1 is a schematic wiring diagram of a starting motor circuit, illustrating a principal form of my invention.

Referring to Fig. 1 in particular, the circuit comprises a main battery 11 which may be considered a six volt battery, but which may be of any other voltage, such as twelve volts. The negative pole of the battery 11 is connected through a ground line 12 to one side of a starter motor 13 and is also grounded at 14 to the engine mount.

The battery 11 is connected in parallel to a smaller auxiliary two volt battery 15, and for this purpose the positive pole of the battery 11 is connected through a line 16, and resistor 17 to the positive pole of battery 15. The negative pole of battery 15 is connected through a second resistor 18 and line 19 to the ground line 12 through the actuating coils 20 and 21 of normally open starting relays 22 and 23, respectively.

A charging circuit is provided for the batteries and comprises the usual engine driven generator 23 and a cut out switch 24 which, according to usual practice, is automatically opened when the engine is not operating. The output side of the generator and cut out switch is connected to the positive pole of the main battery 11 while the input side of the generator is connected to a ground line 25, thus connecting the generator in parallel with both batteries.

The above circuit connections enable the generator to charge both batteries simultaneously during operation of the engine and the values of the resistances 17 and 18 when combined are so chosen as to balance the load presented to the charging circuit by both batteries even though the auxiliary battery is smaller.

It will be noted that since the two batteries are in continuous parallel connection, the larger main battery will continuously maintain the auxiliary battery in proper charge during periods in which the engine is not operating.

It will also be noted that charging of the auxiliary battery either by the main battery or by the generator will be effected through the relay coils 20 and 21, but under no condition, other than when starting, will the flow of current through coils 20 and 21 be sufficient to actuate either relay. Also, the amount of current drained from the main battery in order to maintain the auxiliary battery charged will be relatively small and will decrease as the auxiliary battery becomes charged.

Means are provided to connect both batteries in series when operating the starting motor so as to apply a total of eight volts to the latter. For this purpose, relay 22 has its switch contacts connected between the positive pole of the auxiliary battery 15 and the starting motor 13, while relay 23 has its switch contacts connected between the positive pole of the main battery and the negative pole of the auxiliary battery 11.

A starting switch 26 is located between the upper ends of the relay coils 20 and 21, and the positive pole of the battery 11. When the switch 26 is closed it connects the coils 20 and 21 in parallel with the main battery to energize the coils and thus close the relays.

Since the batteries are now connected in series relation to the starting motor, a total of eight volts will be applied thereto to readily operate the same. The parallel connection between the batteries is not disturbed during operation of the starting motor but this will have little effect on the series flow of current through the batteries.

The ignition circuit of the engine, partly indicated at 27 is connected to the positive pole of the main battery and is thus connected in parallel with both batteries. Thus, even though the voltage applied by both batteries to the starting motor might possibly drop due to excessive current consumption of the latter, the drop in voltage applied to the ignition system will be proportionately less and will thus supply adequate voltage potential to the ignition circuit.

A normally closed switch 45 is located in line 16. This switch may be opened if the engine is to be left idle for an excessively long time in order to eliminate current leakage between the main and auxiliary batteries. However, it has been found in practice that the switch 45 may be maintained closed for periods over two weeks, with the engine idle, without materially affecting the condition of the main battery.

Figure 2:
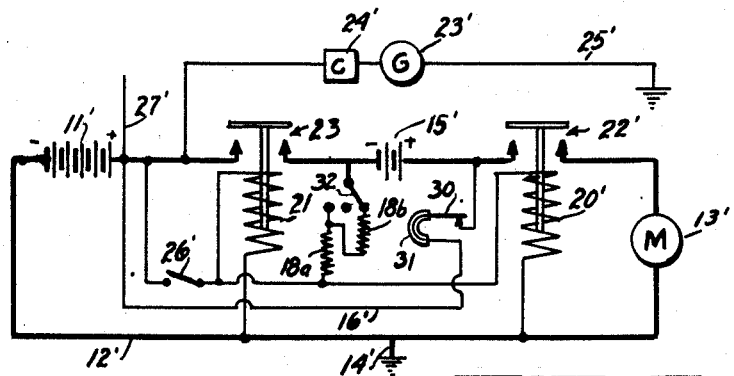
Fig. 2 is a schematic wiring diagram of a modified form of my invention.

Fig. 2 illustrates a modified form of the invention in which components similar to those shown in Fig. 1 are identified by similar but primed reference characters.

Here, however, the resistor 17 is omitted and in its place is provided a normally closed thermo-statically operated switch 30. The latter is operatively connected to a bimetallic strip 31 and these are located in series between the line 16' and the positive pole of the battery 15'.

In the place of resistor 18 are provided two resistors 18a and 18b in series, the upper ends of these resistors being connected to the end taps of a settable three position switch 32. The center tap of the switch is open permitting the switch to be set in its central position for storage purposes in which case there would be no drain on the main battery. The resistance values of the bimetallic strip 31 and resistors 18a and 18b are chosen to substantially balance the load presented to the charging circuit by both batteries when the switch 32 is in its illustrated position even though the auxiliary battery is smaller than the main battery.

When the switch is in its right hand position, it connects resistors 18a and 18b in series which is effective under normal conditions to maintain the auxiliary battery fully charged with a minimum current drain on the starting system. The switch when in its left hand position, allows greater current flow to the auxiliary battery during charging to maintain the same in fully charged condition in circumstances where heavy usage and loads are encountered in the starting system.

When the switch 26' is closed to effect a starting operation a two volt differential will be applied across the bimetallic strip 31, causing it to heat up and thus warp sufficiently to open its switch 30. This disconnects the charging circuit and reduces any power loss which might otherwise be occasioned by a resistor at this point.

The above circuits reduce the amount of electrical wiring required in connecting the auxiliary battery in the electrical circuit of a starting motor wherein one of the solenoids is physically mounted on the starting motor.

Although I have described my invention in detail and have therefore used certain terms and language herein, it is to be understood that the present disclosure is illustrative rather than restrictive and that changes and modifications may be made without departing from the spirit or scope of the invention as set forth in the claims appended hereto.

Having thus described the invention, what I desire to secure by United States Letters Patent is:

1. A starting circuit for an engine having a starting motor and a main battery; comprising an auxiliary battery of less voltage output than said main battery; a resistance element in series with said auxiliary battery; a first normally open relay having contacts connected in series relation between said batteries; said relay having an operating coil located in series with said resistance element; a second normally open relay having contacts connected in series relation between one of said batteries and said starting motor; said second relay having an operating coil located in series with said resistance element; and an energizing circuit for connecting said coils in parallel across one of said batteries.

2. A starting circuit as claimed in claim 1 comprising selectively settable means for disconnecting said resistance element from said auxiliary battery.

3. A starting circuit for an engine having a starting motor and a main battery; comprising an auxiliary battery; a circuit connecting said main battery in parallel relation to said auxiliary battery; a first normally open switch connected in series relation between said batteries; a second normally open switch connected in series relation between one of said batteries and said starting motor; a generating circuit connected on one side to like poles of said batteries and on the opposite side to opposite like poles of said batteries; a resistance element in said parallel circuit for substantially balancing the load presented to said generating circuit by both said batteries; and a normally closed voltage responsive switch in said parallel circuit effective to open said parallel circuit upon presentation of a predetermined voltage differential thereto.

References Cited in the file of this patent

UNITED STATES PATENTS

| | | |
|---|---|---|
| 1,067,631 | Woodbridge | July 15, 1913 |
| 1,192,400 | Edison | July 25, 1916 |
| 1,773,920 | Mayforth | Aug. 26, 1930 |
| 1,828,620 | Rall | Oct. 20, 1931 |
| 2,066,010 | Lindem | Dec. 29, 1936 |
| 2,096,378 | Mitchell | Oct. 19, 1937 |
| 2,248,244 | Leace | July 8, 1941 |
| 2,344,568 | Snyder | Mar. 21, 1944 |
| 2,521,969 | Dugan | Sept. 12, 1950 |
| 2,692,953 | Markett | Oct. 26, 1954 |
| 2,725,488 | Hueffed et al. | Nov. 29, 1955 |
| 2,729,750 | Draper et al. | Jan. 3, 1956 |
| 2,761,978 | Piumi | Sept. 4, 1956 |